United States Patent
Wang et al.

(10) Patent No.: US 9,489,567 B2
(45) Date of Patent: Nov. 8, 2016

(54) TRACKING AND RECOGNITION OF FACES USING SELECTED REGION CLASSIFICATION

(75) Inventors: Tao Wang, Beijing (CN); Jianguo Li, Beijing (CN); Yangzhou Du, Beijing (CN); Qiang Li, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 299 days.

(21) Appl. No.: 13/996,496

(22) PCT Filed: Apr. 11, 2011

(86) PCT No.: PCT/CN2011/072583
§ 371 (c)(1),
(2), (4) Date: May 13, 2014

(87) PCT Pub. No.: WO2012/139269
PCT Pub. Date: Oct. 18, 2012

(65) Prior Publication Data
US 2014/0241574 A1    Aug. 28, 2014

(51) Int. Cl.
*G06K 9/00* (2006.01)

(52) U.S. Cl.
CPC ....... *G06K 9/00288* (2013.01); *G06K 9/00221* (2013.01)

(58) Field of Classification Search
None
See application file for complete search history.

(56) References Cited

U.S. PATENT DOCUMENTS 5,864,630 A * 1/1999 Cosatto ............ G06K 9/00234
                                                   382/103
6,118,887 A * 9/2000 Cosatto ............ G06K 9/00228
                                                   382/103

(Continued)

FOREIGN PATENT DOCUMENTS

CN      1414514 A      4/2003
CN    101771539 A      7/2010

(Continued)

OTHER PUBLICATIONS

FJ Huang and T Chen, "Tracking of Multiple Faces for Human-Computer Interfaces and Virtual Environments," Proc. IEEE Int. Conf. Multimedia, 2000. pp: 1563-1566.*

(Continued)

*Primary Examiner* — Matthew Bella
*Assistant Examiner* — Soo Shin
(74) *Attorney, Agent, or Firm* — Schwabe, Williamson & Wyatt, P.C.

(57) ABSTRACT

Methods, apparatuses, and articles associated with facial tracking and recognition are disclosed. In embodiments, facial images may be detected in video or still images and tracked. After normalization of the facial images, feature data may be extracted from selected regions of the faces to compare to associated feature data in known faces. The selected regions may be determined using a boosting machine learning processes over a set of known images. After extraction, individual two-class comparisons may be performed between corresponding feature data from regions on the tested facial images and from the known facial image. The individual two-class classifications may then be combined to determine a similarity score for the tested face and the known face. If the similarity score exceeds a threshold, an identification of the known face may be output or otherwise used. Additionally, tracking with voting may be performed on faces detected in video. After a threshold of votes is reached, a given tracked face may be associated with a known face.

19 Claims, 11 Drawing Sheets

(56) References Cited

U.S. PATENT DOCUMENTS

| | | | |
|---|---|---|---|
| 6,173,068 B1* | 1/2001 | Prokoski | A61B 5/015 382/115 |
| 7,221,809 B2 | 5/2007 | Geng | |
| 7,430,315 B2 | 9/2008 | Yang et al. | |
| 2005/0147291 A1* | 7/2005 | Huang | G06K 9/6282 382/159 |
| 2008/0080743 A1 | 4/2008 | Schneiderman et al. | |
| 2009/0185723 A1* | 7/2009 | Kurtz | G06K 9/00288 382/118 |
| 2010/0189313 A1* | 7/2010 | Prokoski | A61B 5/0064 382/118 |
| 2011/0043437 A1* | 2/2011 | Tang | G06F 17/30247 345/55 |
| 2011/0249863 A1* | 10/2011 | Ohashi | G06T 7/0081 382/103 |
| 2013/0272548 A1* | 10/2013 | Visser | G06K 9/00624 381/122 |

FOREIGN PATENT DOCUMENTS

| | | |
|---|---|---|
| TW | 477959 B | 3/2002 |
| TW | I246662 B | 1/2006 |
| TW | I303792 B | 12/2008 |
| TW | I318756 B | 12/2009 |

OTHER PUBLICATIONS

FJ Huang and T Chen, "Tracking of Multiple Faces for Human-Computer Interfaces and Virtual Environments," Proc. IEEE Int. Conf. Multimedia, 2000. pp. 1563-1566.*

Office Action mailed Jun. 9, 2014 for Taiwan Patent Application No. 101112473, 11 pages.

International Search Report and Written Opinion mailed Jan. 19, 2012 for International Application No. PCT/CN2011/072583, 11 pages.

* cited by examiner

TRACKING AND RECOGNITION OF FACES USING SELECTED REGION CLASSIFICATION

CROSS REFERENCE TO RELATED APPLICATIONS

The present application is a national phase entry under 35 U.S.C. §371 of International Application No. PCT/CN2011/072583, filed Apr. 11, 2011, entitled "TRACKING AND RECOGNITION OF FACES USING SELECTED REGION CLASSIFICATION", which designated, among the various States, the United States of America. The Specification of the PCT/CN2011/072583 Application is hereby incorporated by reference.

TECHNICAL FIELD

Embodiments of the present disclosure relate to the field of data processing, in particular, to methods, apparatuses and articles associated with recognition of facial images in still images and video.

BACKGROUND

Unless otherwise indicated herein, the materials described in this section are not prior art to the claims in this application and are not admitted to be prior art by inclusion in this section.

Facial recognition systems may automatically identify faces in images or videos. They can be used in, for example, automatic face login, face verification, face identification, face based visual search and character clustering, and video surveillance applications. These systems may be used on various devices, such as smart cameras, smart phones, smart TVs, PCs, laptops, tablets, and web servers.

However, accurate and robust face recognition is challenging in practical use due to variations in image data received by these systems. For example, image data may vary in illumination, face pose, expression, accessory, occlusion, and/or other factors. Existing techniques and systems may perform comparison over extraneous facial image data, resulting in inefficient computation and delays in performing recognition. Additionally, existing recognition techniques may exhibit strong dependence on their training data and develop identification thresholds which are inefficient when used with other data. When performing recognition on test data other than the data the techniques were trained on, existing techniques may demonstrate less-than-desired recognition accuracy. Further, recognition of faces which are displayed in video may prove particularly challenging as the face may change from image frame to image frame, or from moment to moment in the video.

BRIEF DESCRIPTION OF THE DRAWING

Embodiments of the present disclosure will be presented by way of example embodiments, but not limitations, illustrated in the accompanying drawings in which like references denote similar elements, and in which.

DETAILED DESCRIPTION

Figure 1:
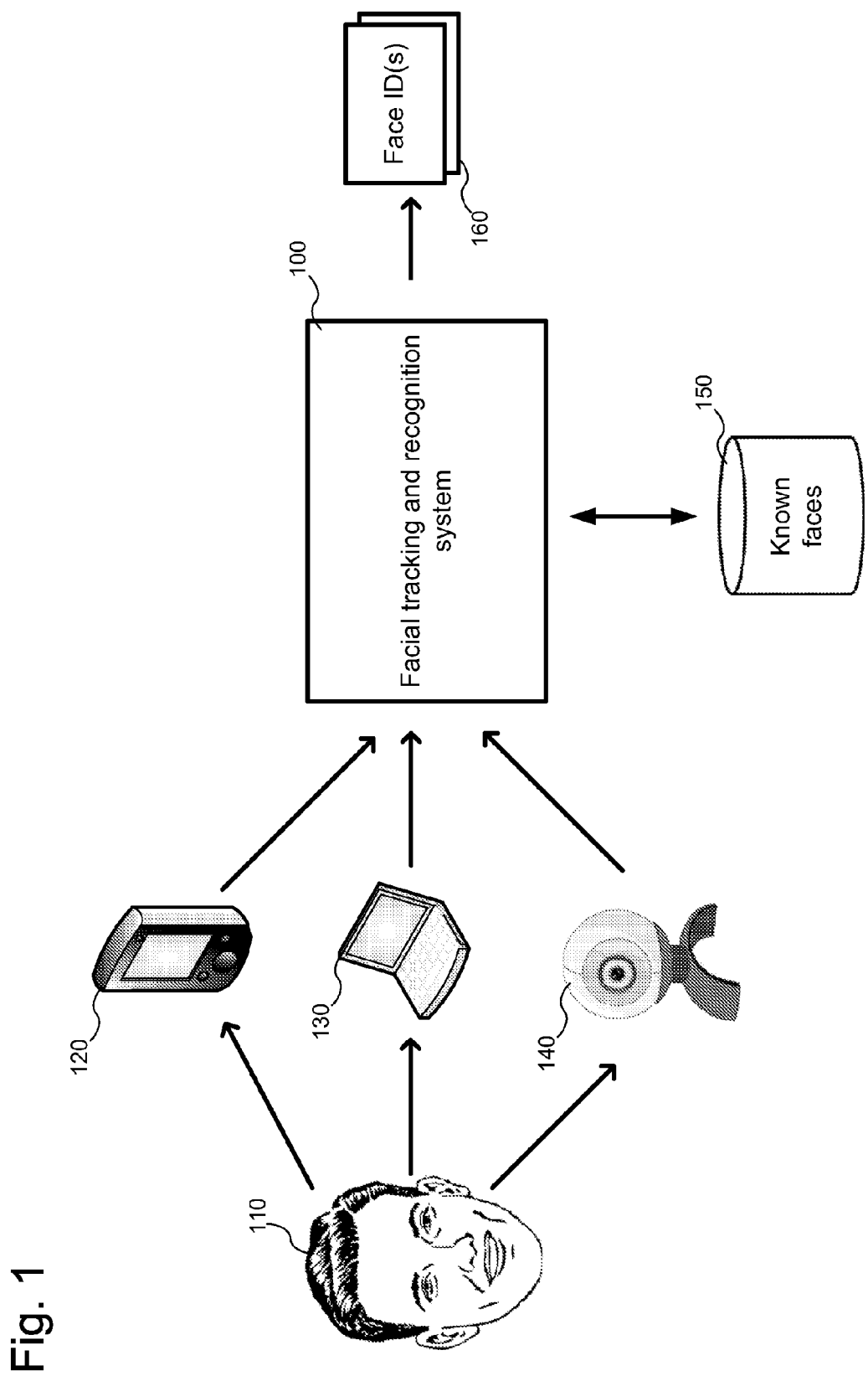
FIG. 1 illustrates an block diagram of entities and components which interoperate with a facial tracking and recognition system, in accordance with various embodiments of the present disclosure.

Methods and apparatuses for performing tracking and recognition of facial images are disclosed. In various embodiments, facial images may be detected in video or still images and tracked. In various embodiments, after normalization of the facial images, feature data may be extracted from selected regions of the faces to compare to associated feature data in known faces. In various embodiments, the selected regions may be determined using a boosting machine learning processes over a set of known images. In various embodiments, after extraction, individual two-class comparisons may be performed between corresponding feature data from regions on the tested facial images and from the known facial image. In various embodiments, the individual two-class classifications may then be combined to determine a similarity score for the tested face and the known face. In various embodiments, if the similarity score exceeds a threshold, an identification of the known face may be output or otherwise used. In various embodiments, tracking with voting may additionally be performed on faces detected in video. In various embodiments, after a threshold of votes is reached, a given tracked face may be associated with a known face.

In various embodiments, a method may include tracking, on a computing apparatus, a facial image with varying appearances in a plurality of image frames of a video signal. The method may further include identifying a known facial image as potentially associated with the tracked facial image, upon meeting an identification condition. The identifying may include determining potential association of the tracked facial image to a number of known facial images, based on the varying appearances, and the identification condition may be based at least in part on the determined associations.

In various embodiments, the identifying may include determining, for a known facial image, after processing a predetermined number of image frames, whether a number of associations to the known facial image determined for the tracked facial image is the greatest among the associations to the known facial images determined for the tracked facial image.

In various embodiments, the identifying may include determining, for a known facial image, whether a number of associations to the known facial image determined for the tracked facial image exceeds a pre-determined threshold.

In various embodiments, the method may further include repeating the tracking and identifying for a second facial image with varying appearances in the plurality of image frames. In various embodiments, the repeating may be performed after performing the tracking and identifying for the first tracked facial image, or in parallel with performing the tracking and identifying for the first tracked facial image.

In various embodiments, the method may further include terminating the tracking and identifying for the first tracked facial image. The method may also further include tracking a third facial image with varying appearances in the plurality of image frames, in parallel with performing the tracking and identifying for the second tracked facial image. The third tracked facial image may be a newly identified facial image with varying appearances in the image frames, and the first tracked facial image may be a longer tracked facial image between the first and second tacked facial images.

In various embodiments, determining potential association of the tracked facial image to a known facial image may include extracting, for an appearance of the tracked facial image, facial feature data in a subset of facial regions pre-selected from a set of facial regions using a set of training facial images. The set of facial regions may substantially span each of the training facial images. Determining potential association of the tracked facial image to a known facial image may further include determining potential association of the tracked facial image to the known facial image based at least in part on the extracted facial feature data in the subset of facial regions. In various embodiments, determining potential association based at least in part on the extracted facial feature data in the subset of facial regions may include generating a similarity score based on the subset of facial regions.

In various embodiments, determining potential association of the tracked facial image to a known facial image may include, for respective facial regions of a plurality of facial regions, making an individual determination as to whether a facial region of an appearance of the tracked facial image is similar to a corresponding facial region of a known facial image. Determining potential association of the tracked facial image to a known facial image may further include, based at least in part on the respective individual determinations, determining a similarity score for the appearance of the tracked facial image and the known facial image. Making an individual determination as to whether a facial region of a facial image is similar to a corresponding facial region of a known facial image may include performing a two-class classification on the corresponding facial regions.

In various embodiments, computer-readable non-transitory storage media may include a plurality of programming instructions stored in the storage medium and configured to cause a computing apparatus, in response to execution of the programming instructions by the computing apparatus, to perform operations. The operations may include extracting, for a facial image, facial feature data in a subset of facial regions pre-selected from a set of facial regions using a set of training facial images. The set of facial regions may substantially span each of the training facial images. The operations may further include classifying the facial image against a known facial image based at least in part on the extracted facial feature data in the subset of facial regions. The subset of facial regions may be pre-selected to reduce an amount of computation required for the classifying, while providing an expected reliability of the classifying.

In various embodiments, the operations may further include selecting the subset of facial regions. The selecting may include performing machine learning using the set of training images.

In various embodiments, the operations may further include selecting the subset of facial regions using the set of training images. The selecting may include selecting a number of facial regions less than or equal to a pre-determined number. The selecting may include selecting a combination of the facial regions with a size less than or equal to the pre-determined number that provides the greatest accuracy in classifying the set of training images.

In various embodiments, a method may include, for respective facial regions of a plurality of facial regions, making an individual determination as to whether a facial region of a facial image is similar to a corresponding facial region of a known facial image. The method may further include, based at least in part on the respective individual determinations, determining a similarity score for the facial image and the known facial image.

In various embodiments, making an individual determination may include performing a two-class classification on the corresponding facial regions. In various embodiments, performing a two-class classification on the test image may include operating a multi-level perceptron associated with the corresponding facial regions. In various embodiments, operating a multi-level perceptron classifier may include operating the multi-level perceptron on a difference between feature data in the corresponding facial regions of the facial image and the known facial image. In various embodiments, determining a similarity score may include performing a mathematical operation on results from the two-class classifications on the corresponding facial regions. In various embodiments, performing the mathematical operation may include summing results from the two-class classifications.

In various embodiments, apparatuses may be endowed with hardware and/or software configured to practice one or more aspects of the above described embodiments of the method of the present disclosure. In various embodiments, an article of manufacture with tangible, non-transitory computer-readable storage medium may be provided with programming instructions configured to cause an apparatus, in response to execution of the programming instructions by the apparatus, to practice one or more aspects of the above described embodiments of the method of the present disclosure.

Various aspects of the illustrative embodiments will now be further described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. A feature described in a parenthetical format denotes the feature as an optional feature, e.g., "an instance of (partitions of) an application service," denotes the application service may or may not be "partitioned."

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

FIG. 1 illustrates, in various embodiments, a block diagram of entities and components which interoperate with a facial tracking and recognition system. In various embodiments, an image may be captured. The image may contain image data of one or more faces 110. In various embodiments, the image may be captured using one or more devices, such as, for example, a mobile device 120, a computer 130, or a camera 140. In various embodiments, the image may be captured on its own as a still image or may be recorded along with other images as part of a video recording.

In various embodiments, the image may then be input into a facial tracking and recognition system 100, which may analyze the recorded image and compare the recorded image to stored images of known faces to determine if the image contains one or more faces which can be identified by the facial tracking and recognition system 100. In various embodiments, the facial tracking and recognition system 100 may track faces in a video in order to locate and isolate facial images which may be analyzed. In various embodiments, the facial tracking and recognition system may communicate with a database of known faces 150 to use in the recognition. After analyzing the image, in various embodiments, the facial tracking and recognition system 100 may output one or more identifiers of the facial images found in the image, such as face IDs 160.

In various embodiments, the facial tracking and recognition system 100 may be incorporated into one of the devices (such as the mobile device 120, a computer 130, or the camera 140) to perform facial recognition in the device. In other embodiments, the facial tracking and recognition system 100 may be separate from an input device and may communicate with the device, such as over a communication network. In various embodiments, the facial tracking and recognition system 100 may cause another operation to be performed upon the recognition of a face, such as facilitating a log in to a secure system. In such embodiments, the facial tracking and recognition system 100 may not output a face ID 160 or may output different information, such as, for example, an account identifier.

Figure 2:
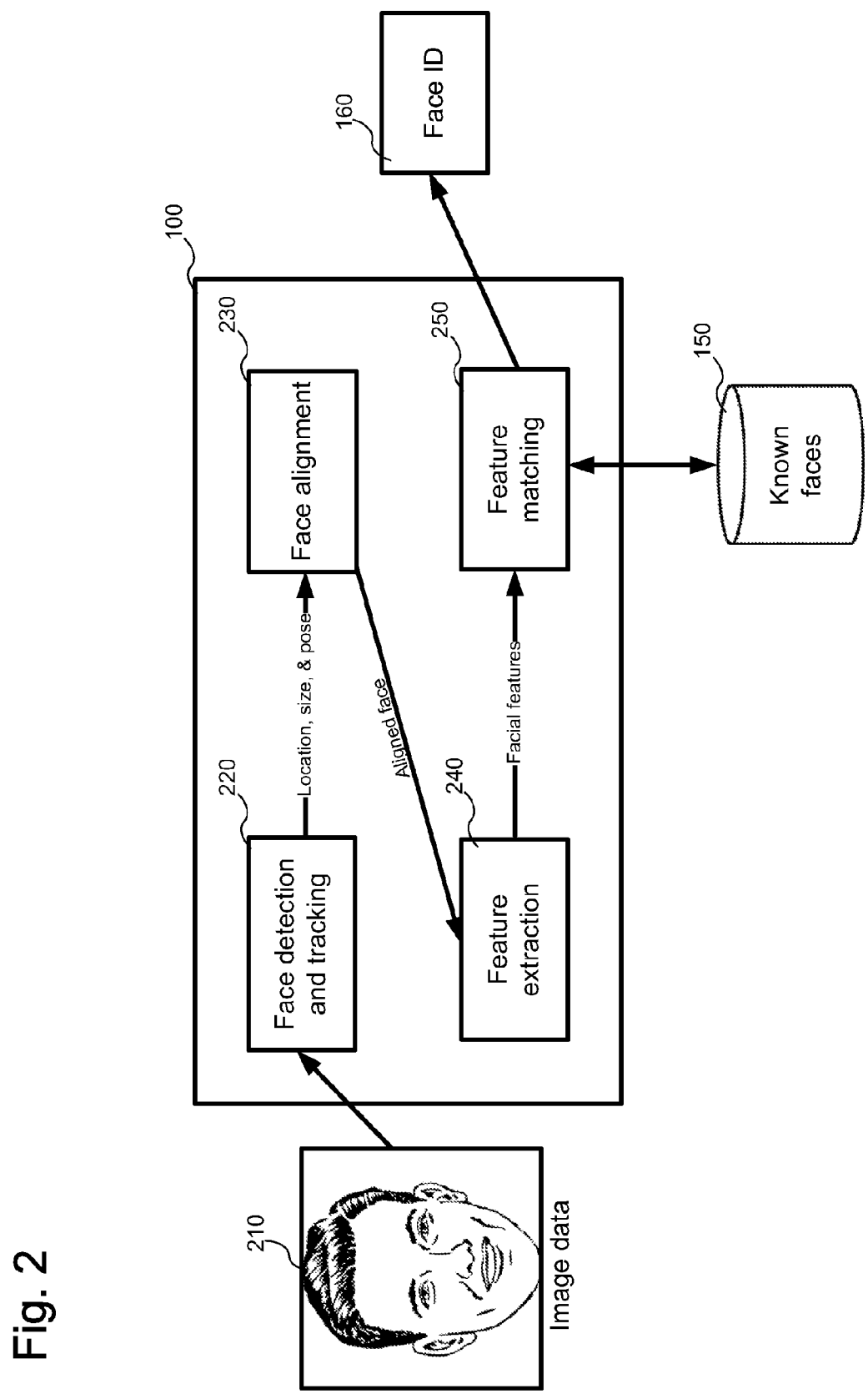
FIG. 2 illustrates, in further detail, components of the facial tracking and recognition system, in accordance with various embodiments of the present disclosure.

FIG. 2 illustrates, in further details, various embodiments of components of the facial tracking and recognition system 100. In various embodiments, the modules and other entities illustrated in FIG. 2 may be combined, split into additional modules, maintained in distinct devices, and/or omitted entirely.

In various embodiments, image data 210 (which may be captured by a still or video camera, as discussed above) is received by a face detection and tracking module 220. In various embodiments, the face detection and tracking module 220, after receiving the image data, may detect faces in the image data 210 and output detected faces' positions, sizes, and poses. In various embodiments, the face detection and tracking module 220 may be configured to analyze still images, images taken from video (such as individual video frames), or both. In various embodiments, as described herein, the face detection and tracking module 220 may be configured to generate a tracking ID for faces it detects. In various embodiments, the face detection and tracking module 220 may be configured to track faces over multiple frames of a video and continually assign the same tracking ID to the same face, even as the face moves in the video. In some embodiments, the face detection and tracking module 220 may be configured to track only up to a pre-determined number of faces. Embodiments of the tracking are described below. In various embodiments, the detected face may be referred to as a "test face," a "tested face," or a "tracked face." Unless the context clearly indicates otherwise, these terms may be considered as synonymous.

In various embodiments, the location, size, and pose information that is output by the face detection and tracking module 220 may be input into a face alignment module 230. In various embodiments, the face alignment module may detect facial landmark points and may normalize a detected face into a pre-defined standard frontal face. This aligned face may then be output from the face alignment module 230 and input into a feature extraction module 240. In various embodiments, the alignment may be skipped, if the location, size and/or pose information indicates that the face is sufficiently aligned for an application purpose.

In various embodiments, the feature extraction module 240 may extract facial features on the aligned face. It may be noted that, in traditional feature extraction, traditional systems and techniques typically extract global features on a whole aligned face, on a grid layout using m×n blocks, or on a manually-assumed set of n regions. In contrast, in various embodiments, the feature extraction module may extract features using a selected set of regions of the face, typically spanning less than the whole face. These regions may be selected before performing facial recognition in order to provide for favorable recognition results. In various embodiments, the set of regions used during testing may be chosen from a larger set of regions that substantially spans a facial image. In various embodiments, the selection of the regions may be performed using machine learning, as will be described herein.

Next, the extracted facial features may be output from the feature extraction module 240 and input into the feature matching module 250. In various embodiments, the feature matching module 250 may compare extracted facial features from the aligned face with associated features from one or more known faces, such as faces stored in a coupled known faces database 150. In various embodiments, the feature matching module 250 may output a face ID 160 associated with a known face that the feature matching module 250 has determined to be a match to the tested face. In various embodiments, the feature matching module 250 may compute similarity scores for various known faces and output the face ID with the highest similarity score as the matching face. In various embodiments, a computed similarity score may be compared to a pre-determined threshold, Thus, if a similarity score is the maximum score for a tracked face and/or is greater than the pre-determined threshold, the face ID associated with that maximum score may be verified and be output. Otherwise, no face ID may be output.

Figure 3:
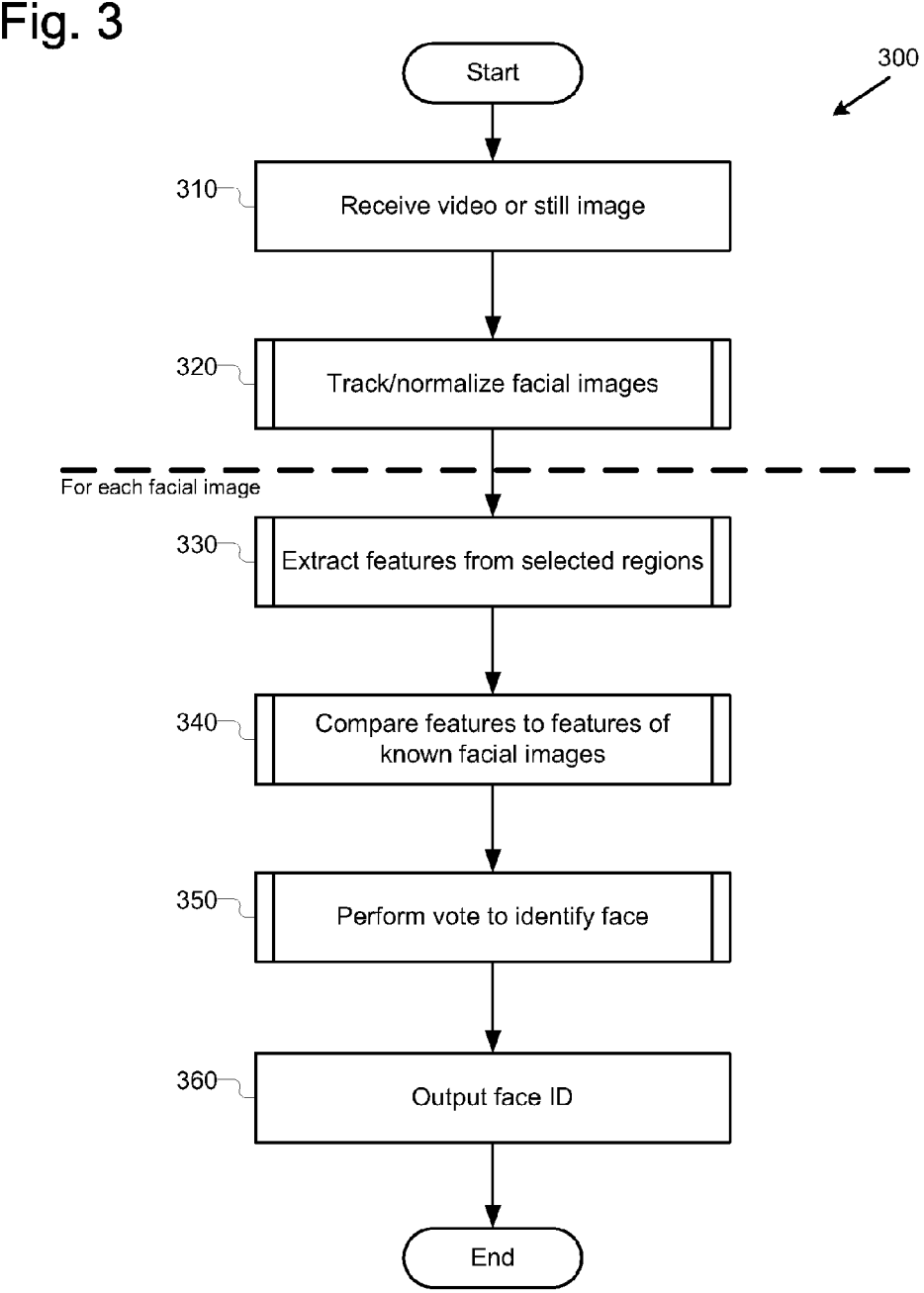
FIG. 3 illustrates an example process for tracking and recognizing faces, in accordance with various embodiments of the present disclosure.

FIG. 3 illustrates an example process 300 of various embodiments of the facial tracking and recognition system 100 tracking and recognizing faces. In various embodiments, the operations illustrated in process 300 may be combined, split into sub-processes or omitted entirely. Further, while the operations may be described herein as being performed by particular modules or other entities, in various embodiments different modules or entities may be used than those explicitly mentioned herein.

The process may begin at operation 310, where video or a still image may be received. In various embodiments, as discussed above, the video or still image may be received from a camera, such as an attached/integrated camera in a portable device or computer, or a camera connected to or integrated with the tracking and recognition system 100 over another connection or a network. Next, at operation 320, the tracking and recognition system 100 may track and normalize facial images out of the video or still image for further processing. Particular embodiments of operation 320 are described below. As discussed above, in various embodiments, and for various input video or still images, one or more facial images may be tracked and normalized at operation 320. In various embodiments, operation 320 may be performed by the face detection and tracking module 220 of tracking and recognition system 100.

The portion of the process illustrated at operations illustrated at operations 330-360 may be performed on an individual per-facial image basis. In various embodiments, the process may be repeated for multiple facial images contained in an input video or still image. In some embodiments, these operations may be performed for a particular facial image in parallel with coordinate processes being performed for another facial image. In other embodiments, operations 330-360 may be performed for each facial image in sequence, without using parallel computation.

At operation 330, the tracking and recognition system 100 may extract features from selected regions of the facial image. In various embodiments, this operation may be performed by the feature extraction module 240 of tracking and recognition system 100. Particular embodiments of operation 330 are described below. Next, at operation 340, the tracking and recognition system 100 may compare the extracted features to features of known facial images. In various embodiments, this operation may be performed by the feature matching module 250 of tracking and recognition system 100. Particular embodiments of operation 340 are described below.

Next, at operation 350, the tracking and recognition system 100 may identify a known face corresponding to a matched facial image. In some embodiments, and in particular when video is being tracked, the identification and selection of a face ID may rely on the outcome of a voting process, as will be described below. Particular embodiments of operation 350 are described below. At operation 360, the face ID may be output. In other embodiments, the tracking and recognition system 100 may perform an action other than outputting the face ID, as described above. The process may then end.

Figure 4:
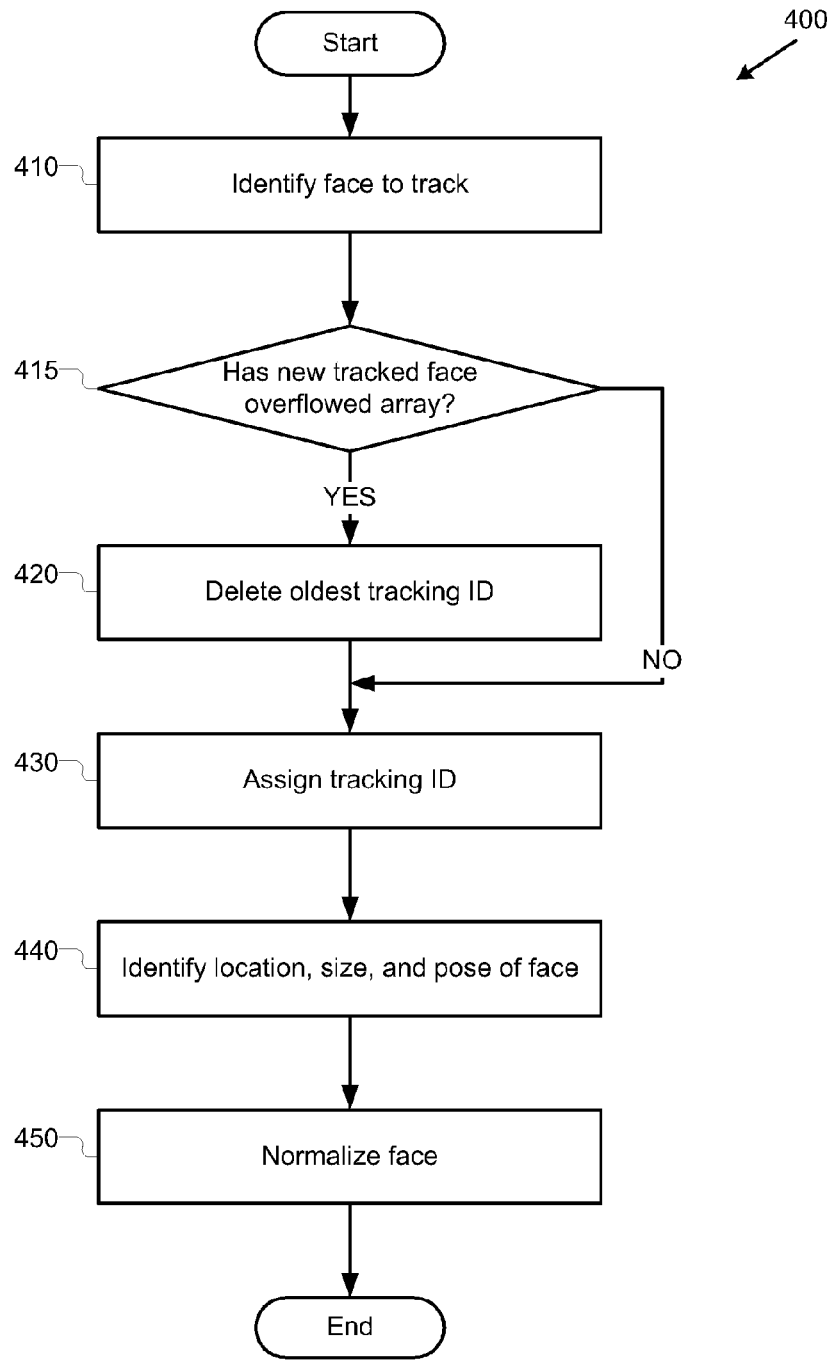
FIG. 4 illustrates an example process for tracking faces, in accordance with various embodiments of the present disclosure.

FIG. 4 illustrates an example process 400 of various embodiments of the facial tracking and recognition system 100 tracking faces. In various embodiments, process 400 may be performed by the face detection and tracking module 220 and face alignment module 230 of tracking and recognition system 100. In various embodiments, the operations illustrated in process 400 may be combined, split into sub-processes or omitted entirely. Further, while the operations may be described herein as being performed by particular modules or other entities, in various embodiments different modules or entities may be used than those explicitly mentioned herein.

The process may begin at operation 410, where the face detection and tracking module 220 may identify a face to track. In various embodiments, the face detection and tracking module 220 may include an array for keeping track of tracked faces, such as by storing tracking IDs. Thus, at decision operation 415, the face detection and tracking module 220 may determine if the newly-identified face will cause the array to overflow. For example, if the face detection and tracking module 220 has a tracking array of size 10, after 10 faces are tracked with unique tracking IDs, a newly-tracked face would cause the array to overflow. If the determination is that the array has overflowed, then at operation 420, the face detection and tracking module 220 may delete, from the array, faces corresponding to the oldest tracking ID. This may be done by the face detection and tracking module 220 because the oldest tracking ID is most likely to be associated with a face that has left the image or video which is being tracked. In various embodiments, other processes may be used for dealing with the array overflow, such as increasing array size or picking a tracking ID to delete through another process.

Next, at operation 430, the face detection and tracking module 220 may assign a new tracking ID to the newly identified face to be tracked. Next, at operation 440, the face detection and tracking module 220 may identify the location, size and pose of the new face to be tracked. At operation 450, the face alignment module 230 may then proceed with normalizing the new face to be tracked, such as described above, for further processing and recognition. The process may then end.

Figure 5:
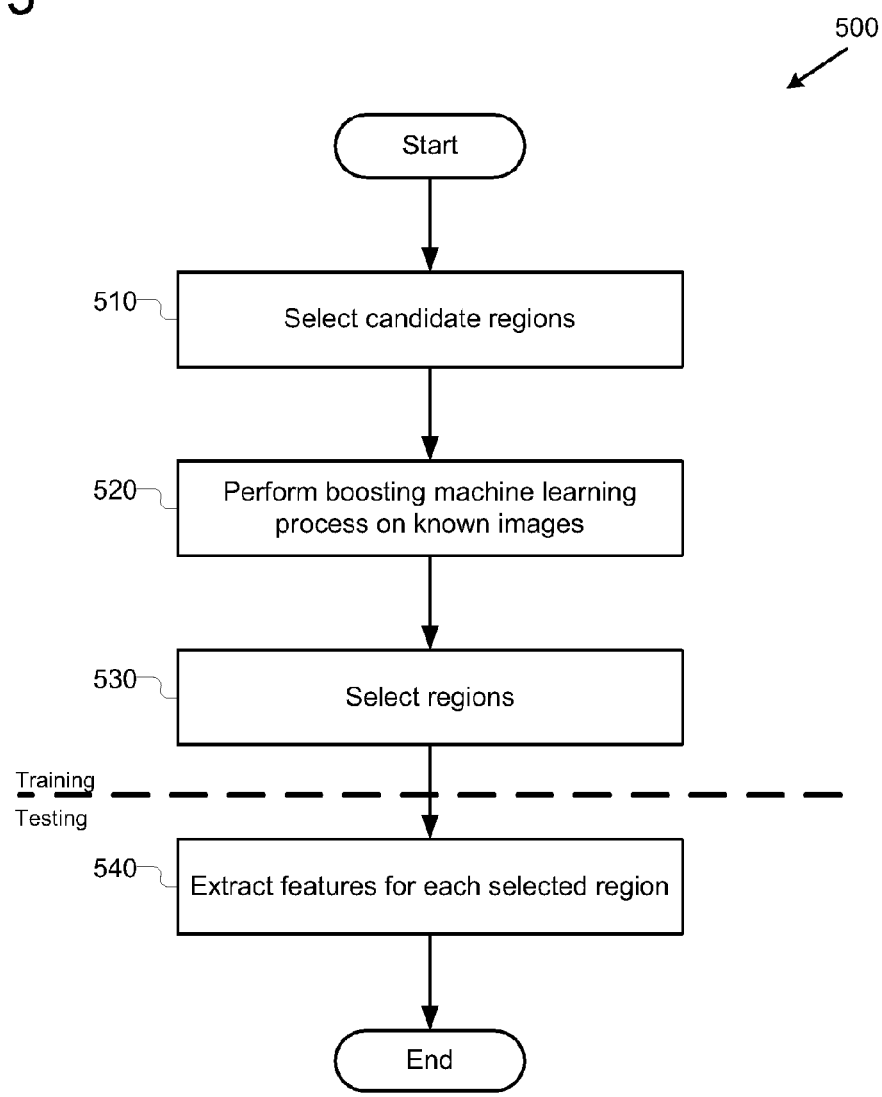
FIG. 5 illustrates an example process for extracting facial features, in accordance with embodiments of the present disclosure.

FIG. 5 illustrates an example process 500 of various embodiments of the facial tracking and recognition system 100 extracting facial features. In various embodiments, process 500 may be performed by the feature extraction module 240 of tracking and recognition system 100. In various embodiments, the operations illustrated in process 500 may be combined, split into sub-processes or omitted entirely. Further, while the operations may be described herein as being performed by particular modules or other entities, in various embodiments different modules or entities may be used than those explicitly mentioned herein.

Process 500 may, in various embodiments be divided into training and testing portions, as illustrated by the dotted line. In various embodiments, training is performed in order to select optimal regions which may be used during facial recognition. What constitutes optimal may vary from implementation to implementation depending on available computing resources and/or desired accuracy. In various embodiments, the training process may be performed by a device or apparatus other than the facial tracking and recognition system 100, or may be performed only once.

The process may begin training at operation 510, where a set of candidate facial regions are selected. In various embodiments, these regions may be selected to substantially span a normalized facial image. For example, a grid (such as a 16×16 grid) may be applied over the normalized facial image, and various combinations of grid squares may be selected as candidate regions. In various embodiments, many hundreds of regions may be considered.

Next, at operation 520, a machine learning process may be performed using training images to select the set of regions for which future testing will be performed. In various embodiments, operation 520 may operate on the candidate regions to select a set of regions which perform optimally (for an application or a number of applications) in facial recognition tasks for a series of known facial images. In various embodiments, a machine learning boosting process, such as one using a multi-level perceptron, may be utilized to evaluate the benefit of adding different candidate regions to the to-be-selected set. In various embodiments, a boosting process will be understood to be a process whereby known faces which are incorrectly classified according to a current set of regions are given more weight during future training.

At operation 530, a set of regions is selected as a result of the boosting machine learning process. In various embodiments, the set of regions is selected to be no greater than a pre-determined amount, such as, for example, 25 regions. In various embodiments, the set of regions is selected to give improved results during testing. Thus, in some embodiments, the set of regions may be chosen to provide the most optimal results found during testing, compared to other sets of regions. Alternatively, in some embodiments, the set of regions may be found to provide better results as compared to other sets of regions which were tested, without requiring an exhaustive test of every combination of regions.

Figure 6:
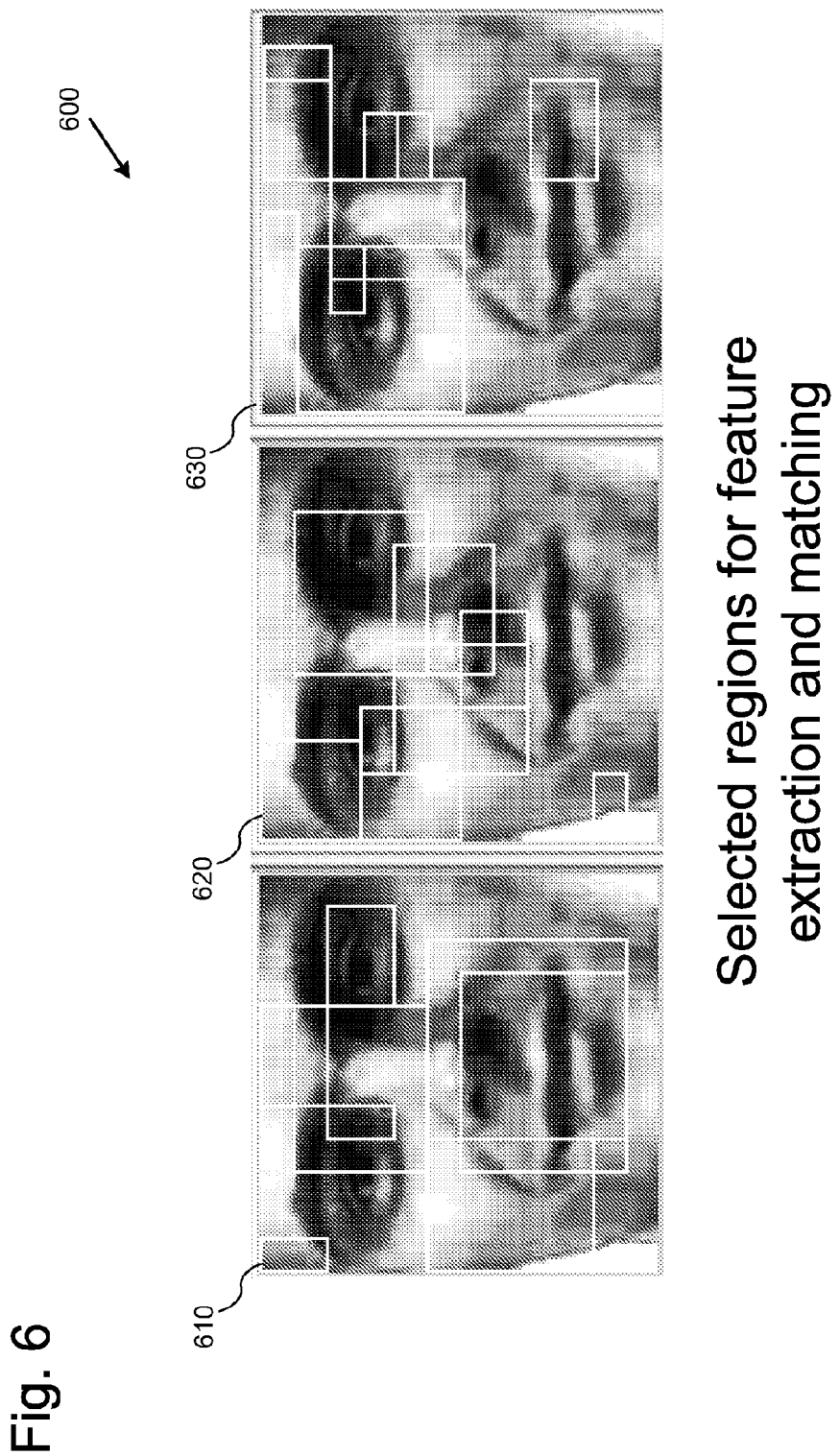
FIG. 6 illustrates examples of selected regions used for facial feature extraction, in accordance with embodiments of the present disclosure.

FIG. 6 illustrates one example 600 of a set of regions which may be chosen by process 500. It may be noted that the regions selected may overlap. Thus, for example, regions 610, 620 and 630 all cover the upper-left corner of the facial image, but have different sizes and cover different facial features.

After the set of regions has been chosen, the selected regions may be used during facial recognition testing. Thus, at operation 540, in various embodiments the feature extraction module 240 may extract features from the tested facial image for each of the selected regions. In various embodiments, the feature extraction module 240 may be configured to store indicators of the selected regions so that they do not have to be re-selected during facial recognition.

Figure 7:
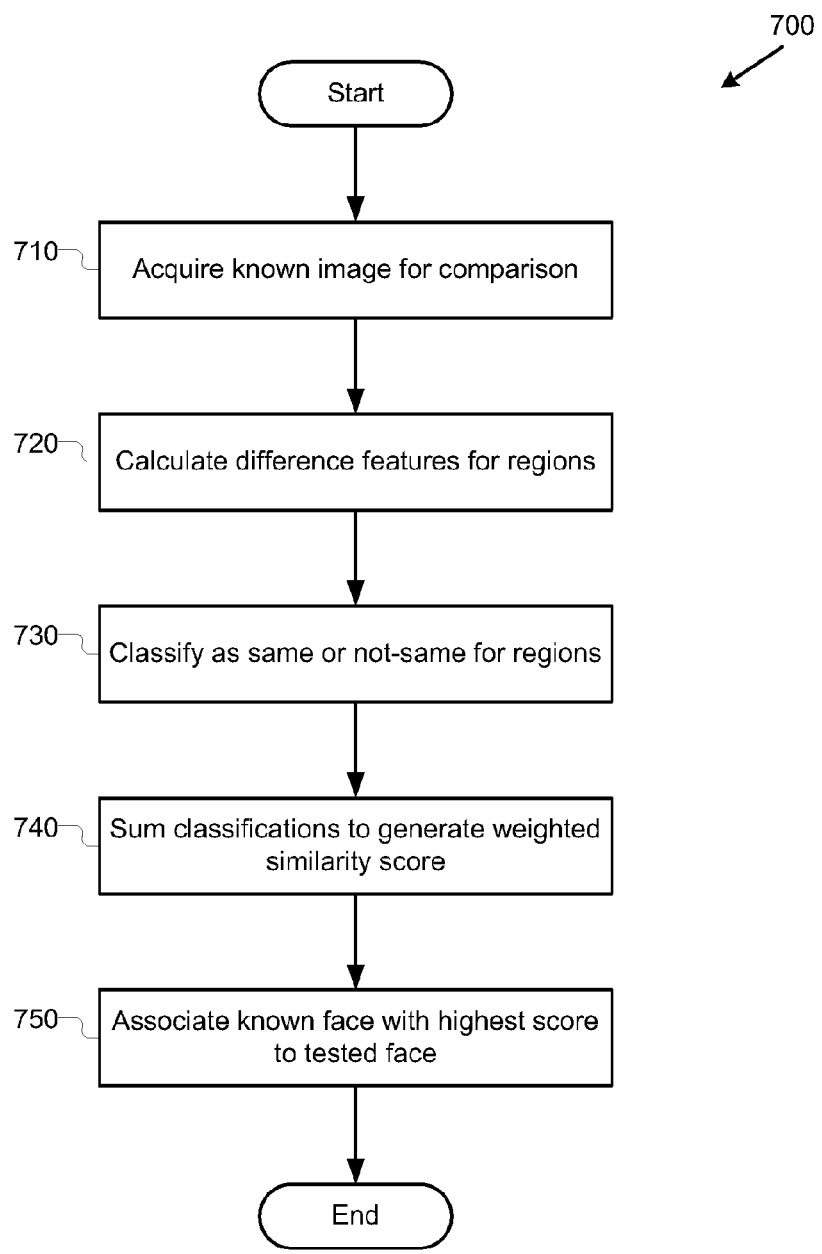
FIG. 7 illustrates an example process for comparing facial features to known faces, in accordance with various embodiments of the present disclosure.

FIG. 7 illustrates an example process 700 of various embodiments of the facial tracking and recognition system 100 comparing facial features to known faces. In various embodiments, process 700 may be performed by the feature matching module 250 of tracking and recognition system 100. In various embodiments, the operations illustrated in process 700 may be combined, split into sub-processes or omitted entirely. Further, while the operations may be described herein as being performed by particular modules or other entities, in various embodiments different modules or entities may be used than those explicitly mentioned herein.

In traditional feature matching, a similarity score may be calculated directly as a multi-class classification problem in a transformed feature space. The face with the best score may then be recognized as the matching face. However, oftentimes these multi-class transformations may be computationally expensive. By contrast, in various embodiments, the feature matching module 250 may perform multiple two-class classifications on individual regions. Essentially, these classifications determine, for a known image, whether a region of a tested facial image is a match to the corresponding region of the tested facial image and output either a "match" or a "non-match" classification. These yes-or-no classifications may then be combined into a single similarity score for the tested facial image without requiring more complex multi-class calculations.

FIG. 7 may begin at operation 710, where the feature matching module 250 acquires a known image for comparison, such as from the known faces database 150. Next at operation 720, the feature matching module 250 may calculate difference features for each selected region. In various embodiments, the difference features may be calculated as absolute feature subtractions or simple pixel-wise subtractions of the tested region from the known region.

Next, at operation 730 the feature matching module 250 may classify, for each region, whether the known image and the tested facial image are the same or not the same. In various embodiments, the feature matching module 250 may include multiple multi-level perceptron ("MLP") classifiers to perform this classification. In various embodiments, a single MLP classifier may be used for each region to determine if the region of the tested facial image is a match or not. In various embodiments, the operations of the MLP classifiers may be performed in parallel with each other or in sequence. Next, at operation 740, the results of the individual MLP classifiers may be combined to calculate a single similarity score. For example, as illustrated in process 700, in various embodiments, the results of the MLP classifiers may be numerical values (such as 1 for a match and 0 for a non-match) and may be summed to arrive at the similarity score. In various embodiments, results of the different MLP classifiers may be weighted differently during the summation. In other embodiments, different mathematical or other processes may be used to combine the results of the MLP classifiers. Then, at operation 750, the known face ID of the known face with the highest similarity score may be output to identify the known face with the tracked face. In various embodiments, the face ID may only be output if the similarity score is above a pre-determined threshold.

Figure 8:
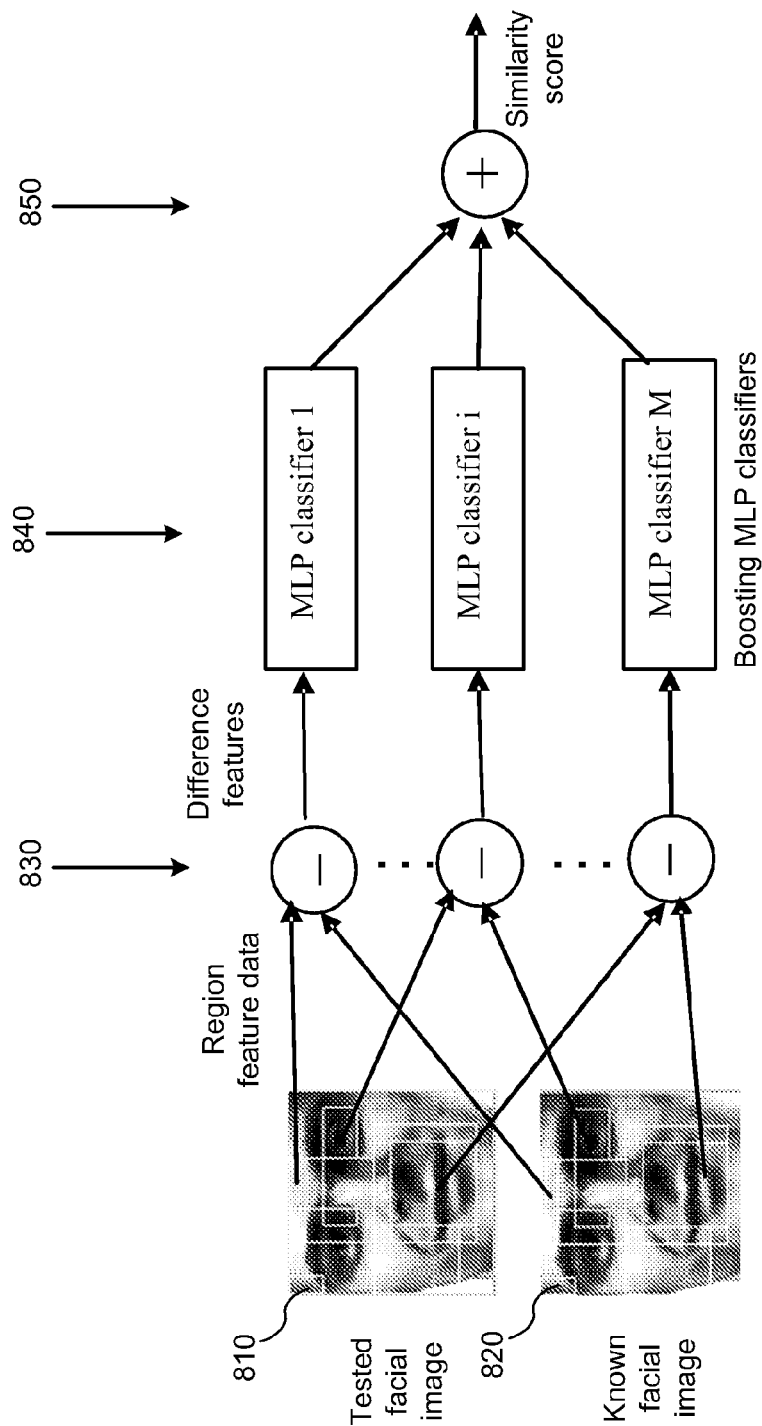
FIG. 8 illustrates example components for comparing facial features and generating a similarity score in accordance with various embodiments of the present disclosure.

FIG. 8 illustrates an example of a use of multiple MLP classifiers to determine a similarity score. FIG. 8 illustrates two faces, a tested facial image 810, and a known facial image 820. Features of corresponding regions of the two faces may be subtracted from each other by difference calculators 830, resulting in difference images. Then, these difference images may be input into various MLP classifiers 840. As FIG. 8 illustrates, separate difference calculators and MLP classifiers may be used for each region (i.e. feature) that is extracted from the facial images. Additionally, as mentioned above, these MLP classifiers may include boosting MLP classifiers (e.g. classifiers which have been trained on feature data through boosting processes). Finally, the results of the MLP classifiers are summed at the summation calculator 850, and a resulting similarity score may be output.

Figure 9:
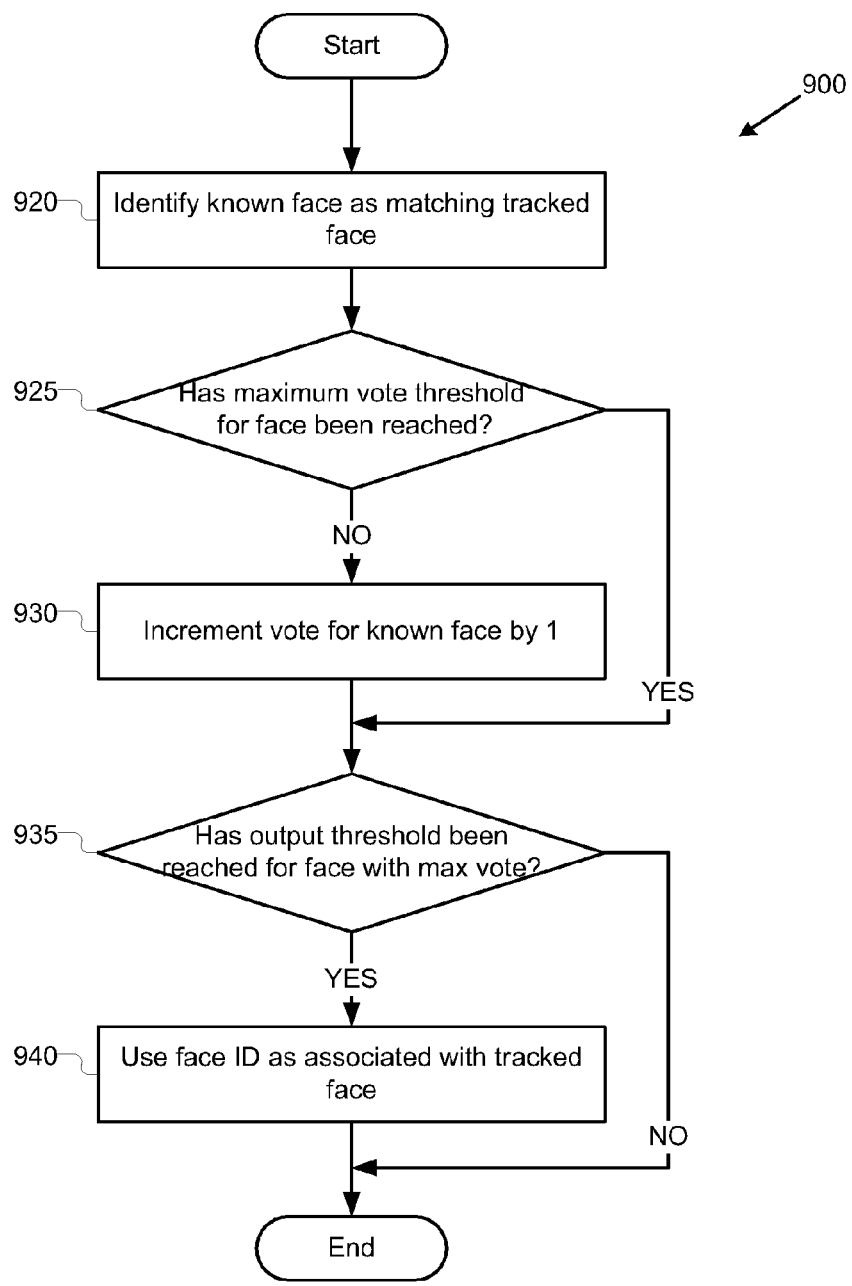
FIG. 9 illustrates an example process for identifying a tested face against a known face in video in accordance with various embodiments of the present disclosure.

FIG. 9 illustrates an example process 900 of various embodiments of the facial tracking and recognition system 100 tracking facial images in video against known facial images. In various embodiments, process 900 may be performed by the feature matching module 250 of tracking and recognition system 100. In various embodiments, the operations illustrated in process 900 may be combined, split into sub-processes or omitted entirely. Further, while the operations may be described herein as being performed by particular modules or other entities, in various embodiments different modules or entities may be used than those explicitly mentioned herein.

In various embodiments, process 900 may be used to detect, track and identify faces seen in video, while providing a facility to correct for changes which occur naturally during the course of the video. Thus, a face may disappear from the video, be replaced by another, or reappear at a later time. In various embodiments, a vote may be kept for each tracked face in the video to determine which of the known faces that tracked faces has been recognized as. The voting process may be used because, in the course of a video, a tracked face may appear to be different known faces due to changes in illumination, face, pose, expression, alignment, etc. Thus, for a given tracked face, the facial tracking and recognition system 100 may have identified the tracked face was as Face A 3 times, Face B 10 times, and Face C 1 time. In various embodiments, the known face with the winning vote at a given time may be output or otherwise indicated as the identified face. In the example, this would mean the facial tracking and recognition system 100 would output that the tracked face is Face B, since Face B has the largest voting number.

The process may begin at operation 920, where a known face is identified as matching a tracked face in a single image. For example the identification may be performed with reference to a single frame of a video. At decision operation 925, the facial tracking and recognition system 100 may determine whether a pre-determined maximum vote threshold has been reached for the face. For example, if the maximum vote threshold were 15, at operation 925 the facial tracking and recognition system 100 would determine if 15 votes had already been received for the known face previously identified. If the threshold had not been reached, then at operation 930, the vote count for that known face may be incremented by 1. If not, the incrementing may be skipped.

In various embodiments, the maximum vote threshold may be maintained in order to prevent a very stable tracked face from being corrected. The utility may be seen in an example where no such threshold is used. In the example, consider a tracked face that is on the screen for 10 minutes and has come back as matching the same known face for the large majority of that time. If the face were to be replaced by a different face, and if the facial tracking and recognition system 100 were to use the same tracking number for the new face, then it would take most of 10 minutes for votes for the new face to outweigh the votes for the old face. This would create a substantial delay in the facial tracking and recognition system 100 producing correct output. In contrast, if a 15-vote threshold is used, then there would be a delay of only roughly 15 frames before the facial tracking and recognition system 100 produced the correct output.

After either operation 925 or 930, the process may then continue to decision operation 935, where the facial tracking and recognition system 100 may consider the known face with the greatest votes for the tracked face, and determine if a pre-determined output threshold has been reached for that known face. In this case, the pre-determined output threshold may be used to prevent the facial tracking and recognition system 100 from outputting an identification too quickly. For example, the facial tracking and recognition system 100 may wait until it has received 3 votes for a known face before outputting the result. Then, at operation 940, the known face ID may be output as being associated with the tracked face. The process may then end.

Figure 10:
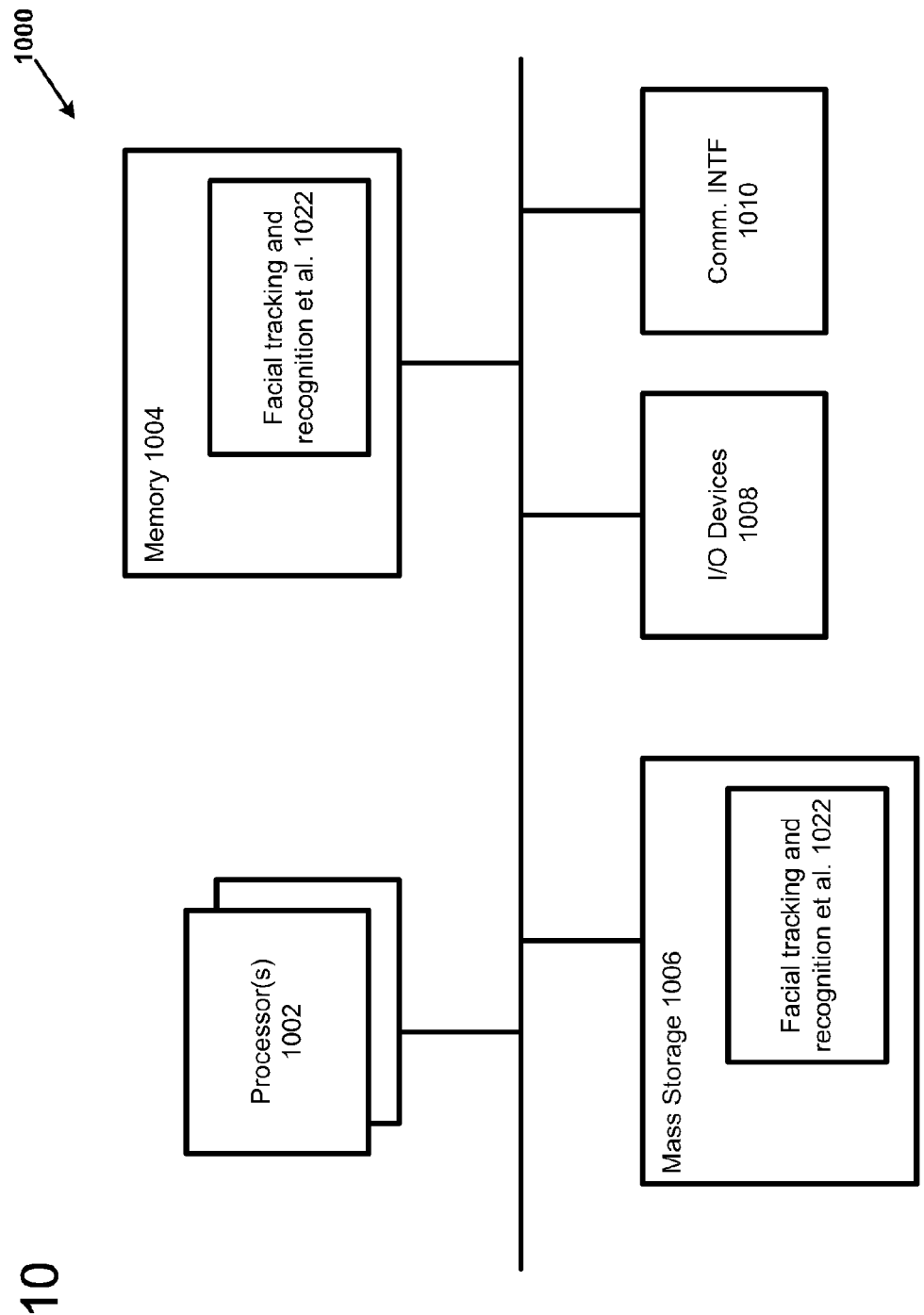
FIG. 10 illustrates an example computer system suitable for use to practice facial tracking and recognition, in accordance with embodiments of the present disclosure.

FIG. 10 illustrates an example computer system suitable for use to practice the facial tracking and recognition, in accordance with various embodiments of the present disclosure. As shown, computing system 1000 may include a number of processors or processor cores 1002, and system memory 1004. For the purpose of this application, including the claims, the terms "processor" and "processor cores" may be considered synonymous, unless the context clearly requires otherwise. Additionally, computing system 1000 may include mass storage devices 1006 (such as diskette, hard drive, compact disc read only memory (CDROM) and so forth), input/output devices 1008 (such as display, keyboard, cursor control and so forth) and communication interfaces 1010 (such as network interface cards, modems and so forth). The elements may be coupled to each other via system bus 1012, which represents one or more buses. In the case of multiple buses, they may be bridged by one or more bus bridges (not shown).

Each of these elements performs its conventional functions known in the art. In particular, system memory 1004 and mass storage 1006 may be employed to store a working copy and a permanent copy of the programming instructions implementing the facial tracking and recognition and other related routines, herein collectively denoted as 1022. The various components may be implemented by assembler instructions supported by processor(s) 1002 or high-level languages, such as, for example, C, that can be compiled into such instructions.

The permanent copy of the programming instructions may be placed into permanent storage 1006 in the factory, or in the field, through, for example, a distribution medium (not shown), such as a compact disc (CD), or through communication interface 1010 (e.g., from a distribution server (not shown)). That is, one or more distribution media having an implementation of the agent program may be employed to distribute the agent and program various computing devices.

The constitution of these elements 1002-1012 are known, and accordingly will not be further described.

Figure 11:
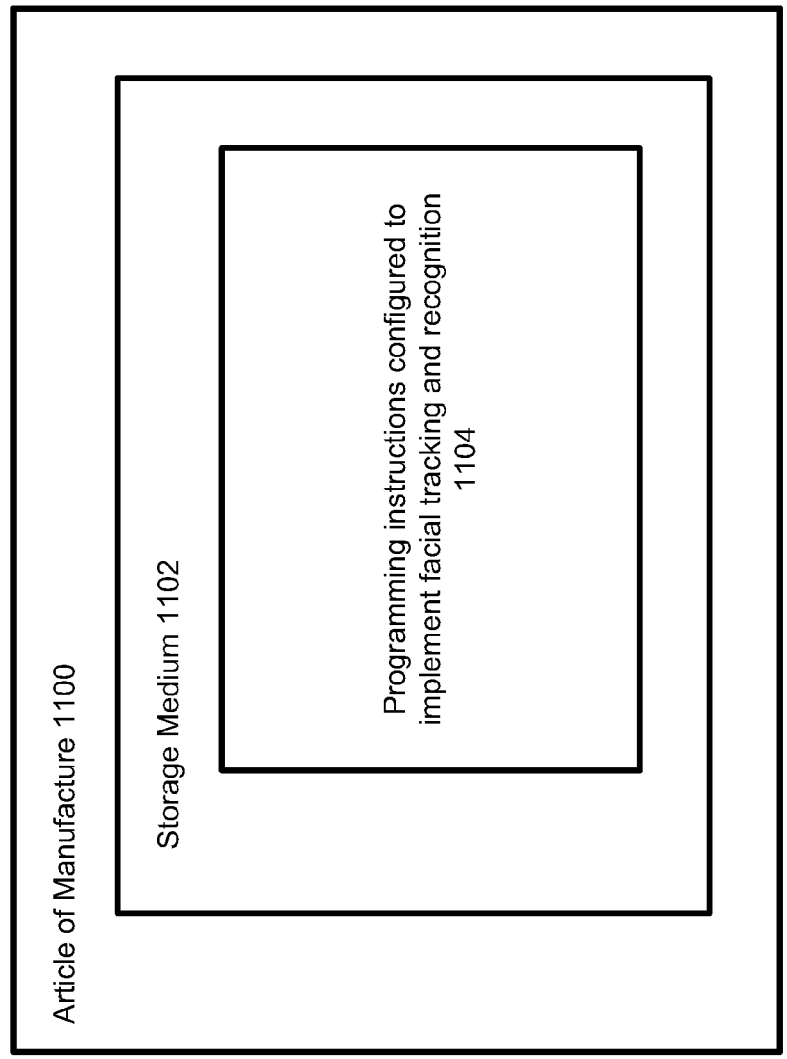
FIG. 11 illustrates an article of manufacture having programming instructions configured to cause an apparatus to practice facial tracking and recognition, in accordance with embodiments of the present disclosure.

FIG. 11 illustrates an article of manufacture with programming instructions configured to enable an apparatus to practice facial tracking and recognition, in accordance with embodiments of the present disclosure. As shown, article of manufacture 1100 may include computer-readable non-transitory storage medium 1102. Storage medium 1102 may include programming instructions 1104 configured to implement facial tracking and recognition.

Storage medium 1102 represents a broad range of persistent storage medium known in the art, including but are not limited to flash memory, optical or magnetic disks. Programming instructions 1104, in particular, may enable an apparatus, in response to their execution by the apparatus to perform operations including
- tracking, by a computing apparatus, a facial image with varying appearances in a plurality of image frames of a video signal; and
- identifying, by the computing apparatus, a known facial image as potentially associated with the tracked facial image, upon meeting an identification condition;
- wherein identifying comprises determining potential association of the tracked facial image to a number of known facial images, based on the varying appearances, and
- wherein identification condition is based at least in part on the determined associations.

Programming instructions 1104, in particular, may also enable an apparatus, in response to their execution by the apparatus to perform operations including
- extracting, for a facial image, facial feature data in a subset of facial regions pre-selected from a set of facial regions using a set of training facial images, the set of facial regions substantially spanning each of the training facial images; and
- classifying the facial image against a known facial image based at least in part on the extracted facial feature data in the subset of facial regions;
- wherein the subset of facial regions is pre-selected to reduce an amount of computation required for the classifying, while providing an expected reliability of the classifying.

Programming instructions 1104, in particular, may also enable an apparatus, in response to their execution by the apparatus to perform operations including:

for respective facial regions of a plurality of facial regions, making an individual determination, by the computing apparatus, as to whether a facial region of a facial image is similar to a corresponding facial region of a known facial image; and based at least in part on the respective individual determinations, determining, by the computing apparatus a similarity score for the facial image and the known facial image.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method comprising:

tracking, by a computer apparatus, a facial image with varying appearances in a plurality of image frames of a video signal; and identifying, by the computer apparatus, a known facial image as potentially associated with the tracked facial image with varying appearances upon meeting an identification condition, wherein the identifying comprises:

determining, by the computer apparatus, a set of candidate regions from a plurality of areas, wherein the plurality of areas spans an entirety of the tracked facial image with varying appearances, and wherein each candidate region of the set of candidate regions comprises varying combinations of the areas, selecting, by the computer apparatus, a set of facial regions from the set of candidate regions based on a result of a machine learning process, extracting, by the computer apparatus, facial feature data from a subset of facial regions of the tracked facial image with varying appearances, and determining, by the computer apparatus, whether a number of associations of the tracked facial image with varying appearances to a number of known facial images, based on the extracted facial feature data in the subset of facial regions, exceeds a predetermined threshold across the varying appearances, and wherein the identification condition is based at least in part on the determined associations.

2. The method of claim 1, further comprising:

outputting, by the computer apparatus, the identified known facial image upon identification.

3. The method of claim 1, wherein the identifying further comprises:

determining, by the computer apparatus, for a known facial image, after processing a predetermined number of image frames, whether a number of associations to the known facial image determined for the tracked facial image is greatest among the associations to the known facial images determined for the tracked facial image.

4. The method of claim 1, wherein the tracked facial image with varying appearances is a first tracked facial image, and wherein the method further comprises:

repeating, by the computer apparatus, the tracking and identifying for a second facial image with varying appearances in the plurality of image frames, after performing the tracking and identifying for the first tracked facial image.

5. The method of claim 1, wherein the tracked facial image with varying appearances is a first tracked facial image, and wherein the method further comprises:

performing, by the computer apparatus, the tracking and identifying for a second facial image with varying appearances in the plurality of image frames, in parallel with performing the tracking and identifying for the first tracked facial image.

6. The method of claim 1, wherein the subset of facial regions are selected from a set of facial regions using a set of training facial images and the set of facial regions substantially span each of the training facial images, and wherein the selection of the subset of facial regions using the set of training facial images comprises:

selecting, by the computer apparatus, a set of candidate facial regions from a set of known facial images; and determining, by the computer apparatus, the set of facial regions from the set of candidate facial regions by performing a boosting process on the set of candidate facial regions, wherein the boosting process includes assigning more weight during a future training process to known faces that are incorrectly classified according to the set of training facial images than known faces that are correctly classified according to the set of training facial images.

7. The method of claim 1, wherein the determining the potential association of the tracked facial image with varying appearances to a known facial image comprises:

determining, by the computer apparatus, whether individual facial regions of the subset of facial regions in an appearance of the tracked facial image with varying appearances is similar to a corresponding facial region of a known facial image; and determining, by the computer apparatus, a similarity score for the appearance of the tacked facial image with varying appearances and the known facial image based at least in part on a number of the individual facial regions in the appearance of the tracked facial image with varying appearances determined to be similar to the corresponding facial regions of the known facial image.

8. An apparatus comprising:

one or more processors; and a non-transitory storage medium coupled to the one or more processors, having a plurality of programming instructions that cause the apparatus, in response to execution by the one or more processors, to:

track a facial image with varying appearances in a plurality of image frames of a video signal; and identify a known facial image as potentially associated with the tracked facial image with varying appearances upon meeting an identification condition;

wherein to identify the known facial image as potentially associated with the tracked facial image, the apparatus, in response to execution of the plurality of programming instructions by the one or more processors, is to:

determine a set of candidate regions from a plurality of areas, wherein the plurality of areas spans an entirety of the tracked facial image with varying appearances, and wherein each candidate region of the set of candidate regions comprises varying combinations of the areas,
select a set of facial regions from the set of candidate regions based on a result of a machine learning process,
extract facial feature data from a subset of facial regions of the tracked facial image with varying appearances, and
determine whether a number of associations of the tracked facial image with varying appearances to a number of known facial images, based on the extracted facial feature data in the subset of facial regions, exceeds a predetermined threshold across the varying appearances; and
wherein the identification condition is based at least in part on the determined associations.

9. The apparatus of claim 8, wherein to identify the known facial image, the apparatus, in response to execution of the plurality of programming instructions by the one or more processors, is to determine, for a known facial image, after processing a predetermined number of image frames, whether a number of associations to the known facial image determined for the tracked facial image with varying appearances is greatest among the associations to the known facial images determined for the tracked facial image with varying appearances.

10. The apparatus of claim 8, wherein the tracked facial image is a first tracked facial image, and wherein the apparatus, in response to execution of the plurality of programming instructions, is to repeat the track and identify for a second facial image with varying appearances in the plurality of image frames, after performing the track and identify for the first tracked facial image.

11. The apparatus of claim 8, wherein the tracked facial image is a first tracked facial image, and wherein the apparatus, in response to execution of the plurality of programming instructions, is to perform the track and identify for a second facial image with varying appearances in the plurality of image frames, in parallel with performance of the track and identify for the first tracked facial image.

12. The apparatus of claim 8, wherein the subset of facial regions are selected from a set of facial regions using a set of training facial images and the set of facial regions substantially span each of the training facial images, and wherein to select the subset of facial regions using the set of training facial images the apparatus, in response to execution of the plurality of programming instructions by the one or more processors, is to:
select a set of candidate facial regions from a set of stored images; and
determine the set of facial regions from the set of candidate facial regions by performing a boosting process on the set of candidate facial regions.

13. One or more non-transitory computer-readable media including instructions to cause a computer apparatus, in response to execution of the instructions by the computer apparatus, to:
track a facial image with varying appearances in a plurality of image frames of a video signal; and
identify a known facial image as potentially associated with the tracked facial image with varying appearances upon meeting an identification condition,
wherein to identify the known facial image, the computer apparatus, in response to execution of the instructions by the computer apparatus, is to:
determine a set of candidate regions from a plurality of areas, wherein the plurality of areas spans an entirety of the tracked facial image with varying appearances, and wherein each candidate region of the set of candidate regions comprises varying combinations of the areas,
select a set of facial regions from the set of candidate regions based on a result of a machine learning process,
extract facial feature data from a subset of facial regions of the tracked facial image with varying appearances, and
determine whether a number of associations of the tracked facial image with varying appearances to each of a number of known facial images, based on the extracted facial feature data in the subset of facial regions, exceeds a predetermined threshold across the varying appearances, and
wherein the identification condition is based at least in part on the determined associations.

14. The one or more non-transitory computer-readable media of claim 13, wherein the instructions cause the computer apparatus, in response to execution of the instructions by the computer apparatus, to:
determine, for a known facial image, after processing a predetermined number of image frames, whether a number of associations to the known facial image determined for the tracked facial image is greatest among the associations to the known facial images determined for the tracked facial image.

15. The one or more non-transitory computer-readable media of claim 13, wherein the tracked facial image with varying appearances is a first tracked facial image, and wherein the instructions cause the computer apparatus, in response to execution of the instructions by the computer apparatus, to:
repeat the tracking and identification for a second facial image with varying appearances in the plurality of image frames, after performance of the tracking and identification for the first tracked facial image; or
perform the tracking and identification for a second facial image with varying appearances in the plurality of image frames in parallel with performance of the tracking and identification for the first tracked facial image.

16. The one or more non-transitory computer-readable media of claim 13, wherein the subset of facial regions are selected from a set of facial regions using a set of training facial images and the set of facial regions substantially span each of the training facial images, and wherein to select the subset of facial regions using the set of training facial images the computer apparatus, in response to execution of the instructions by the computer apparatus, is to:
select a set of candidate facial regions from a set of known facial images; and
determine the set of facial regions from the set of candidate facial regions by performing a boosting process on the set of candidate facial regions.

17. The one or more non-transitory computer-readable media of claim 13, wherein to determine the potential association of the tracked facial image with varying appearances to a known facial image, the computer apparatus, in response to execution of the instructions by the computer apparatus, is to:
determine whether individual facial regions of the subset of facial regions in an appearance of the tracked facial image with varying appearances is similar to a corresponding facial region of a known facial image; and determine a similarity score for the appearance of the tacked facial image with varying appearances and the known facial image based at least in part on a number of the individual facial regions in the appearance of the tracked facial image with varying appearances are determined to be similar to the corresponding facial regions of the known facial image.

18. The one or more non-transitory computer-readable media of claim 13, wherein at least one facial region of the subset of facial regions has a different size or a different shape than other facial regions of the subset of facial regions; or at least one facial region of the subset of facial regions is not adjacent to other facial regions of the subset of facial regions.

19. The one or more non-transitory computer-readable media of claim 13, wherein at least one facial region of the subset of facial regions entirely or partially overlaps another facial region of the subset of facial regions.

* * * * *